United States Patent
Sellers

(10) Patent No.: US 11,057,428 B1
(45) Date of Patent: *Jul. 6, 2021

(54) HONEYTOKEN TRACKER

(71) Applicant: Rapid7, Inc., Boston, MA (US)

(72) Inventor: Thomas Eugene Sellers, Georgetown, TX (US)

(73) Assignee: Rapid7, Inc., Boston, MA (US)

( * ) Notice: Subject to any disclaimer, the term of this patent is extended or adjusted under 35 U.S.C. 154(b) by 126 days.

This patent is subject to a terminal disclaimer.

(21) Appl. No.: 16/369,133

(22) Filed: Mar. 29, 2019

Related U.S. Application Data

(63) Continuation-in-part of application No. 16/367,502, filed on Mar. 28, 2019.

(51) Int. Cl.
   *G06F 11/00* (2006.01)
   *H04L 29/06* (2006.01)
   *G06F 16/27* (2019.01)

(52) U.S. Cl.
   CPC .......... *H04L 63/1491* (2013.01); *G06F 16/27* (2019.01); *H04L 63/1416* (2013.01)

(58) Field of Classification Search
   CPC ........ G06F 16/27; G06F 21/55; G06F 21/566; G06F 21/577; G06F 21/316; H04L 63/1416; H04L 63/1491; H04L 63/1433; H04L 2463/146; H04L 29/06904; H04L 9/002
   See application file for complete search history.

(56) References Cited

U.S. PATENT DOCUMENTS

| | | | | |
|---|---|---|---|---|
| 6,910,135 B1* | 6/2005 | Grainger | ............... | G06F 21/316 709/202 |
| 9,954,893 B1* | 4/2018 | Zhao | ................... | H04L 63/1416 |
| 10,110,629 B1* | 10/2018 | Kruse | ................. | H04L 63/0236 |
| 10,397,273 B1* | 8/2019 | Stickle | ................ | H04L 63/1425 |
| 10,404,747 B1* | 9/2019 | Sela | ..................... | H04L 63/1491 |
| 2002/0162017 A1* | 10/2002 | Sorkin | ................ | H04L 63/1408 726/4 |
| 2005/0166072 A1* | 7/2005 | Converse | ............ | H04W 12/122 726/5 |
| 2005/0193429 A1* | 9/2005 | Demopoulos | ....... | H04L 63/1408 726/23 |
| 2007/0061883 A1* | 3/2007 | Lyle | .................... | H04L 63/1441 726/23 |
| 2007/0162973 A1* | 7/2007 | Schneier | ................. | H04L 63/20 726/22 |
| 2008/0104700 A1* | 5/2008 | Fagone | ............... | H04L 63/1491 726/22 |

(Continued)

*Primary Examiner* — Farid Homayounmehr
*Assistant Examiner* — Lizbeth Torres-Diaz
(74) *Attorney, Agent, or Firm* — Ashwin Anand

(57) ABSTRACT

Disclosed herein are methods, systems, and processes for tracking honeytokens. A malicious attack from an attacker is received at a honeypot and a determination is made that an attack event associated with the malicious attack has compromised deceptive credential information maintained by the honeypot. A unique credential pair that corresponds to the deceptive credential information sought by the attack event is generated and a honeytoken tracker state table is modified to include the unique credential pair and attack event metadata in association with the attack event. The unique credential pair is then transmitted to the attacker.

20 Claims, 10 Drawing Sheets

300

| Honeytoken Tracker State Table 125 | | | | | | | |
|---|---|---|---|---|---|---|---|
| Attack Event Field 305 | Attacker Source Field 310 | Targeted Honeypot Field 315 | Access Credentials Field 320 | Attack Metadata Field 325 | Horizontal Target Field 330 | Vertical Target Field 335 | Attack Context Field 340 |
| HTTP honey service | 208.118.227.1 | 105(1) | Credential information | Directory traversal | Mimicked Service 130(2) on honeypot 105(2) | Mimicked Service 130(1) | Honeytoken Tracker 185(1) |
| Database | 225.80.75.2 | 105(2) | Command shell | Meterpreter | None | Mimicked Service 130(2) on honeypot 105(2) | Honeytoken Tracker 185(1) and Personality 220(1) |
| SMB Services | 208.118.227.1 | 105(3) 105(4) 105(5) | Windows hashes | Pass the Hash | Mimicked Services 130(3)-(5) on honeypots 105(3)-(5) | None | Honeytoken Tracker 185(1) and Personality 220(2) |
| ⋮ | ⋮ | ⋮ | ⋮ | ⋮ | ⋮ | ⋮ | ⋮ |

(56) References Cited

U.S. PATENT DOCUMENTS

| | | | |
|---|---|---|---|
| 2008/0271151 A1* | 10/2008 | Blake | H04L 63/1408 726/25 |
| 2008/0282339 A1* | 11/2008 | Nakae | H04L 63/1408 726/13 |
| 2009/0049546 A1* | 2/2009 | Verma | H04L 63/1491 726/22 |
| 2009/0064331 A1* | 3/2009 | Lyle | H04L 63/1458 726/22 |
| 2009/0328213 A1* | 12/2009 | Blake | H04L 63/1491 726/23 |
| 2009/0328216 A1* | 12/2009 | Rafalovich | H04L 43/0876 726/23 |
| 2012/0084866 A1* | 4/2012 | Stolfo | H04L 63/1416 726/25 |
| 2013/0133074 A1* | 5/2013 | Amoroso | H04L 63/1408 726/25 |
| 2014/0143867 A1* | 5/2014 | Tanizawa | H04L 9/0855 726/22 |
| 2015/0013006 A1* | 1/2015 | Shulman | H04L 63/0263 726/23 |
| 2015/0373044 A1* | 12/2015 | Stiansen | H04L 63/1408 726/22 |
| 2016/0012222 A1* | 1/2016 | Stolfo | G06F 21/554 726/23 |
| 2016/0149790 A1* | 5/2016 | Zimmermann | G06F 9/45558 709/224 |
| 2017/0134405 A1* | 5/2017 | Ahmadzadeh | H04L 63/1433 |
| 2017/0134423 A1* | 5/2017 | Sysman | G06F 21/554 |
| 2017/0149832 A1* | 5/2017 | Touboul | H04L 63/20 |
| 2017/0163682 A1* | 6/2017 | Yu | G06F 8/65 |
| 2017/0230336 A1* | 8/2017 | Bingham | H04L 63/1491 |
| 2017/0230384 A1* | 8/2017 | Touboul | H04L 63/102 |
| 2017/0310704 A1* | 10/2017 | Wu | H04L 63/1433 |
| 2017/0339186 A1* | 11/2017 | Gurvich | H04L 67/1097 |
| 2018/0013731 A1* | 1/2018 | Maheshwari | G06F 21/80 |
| 2018/0063191 A1* | 3/2018 | Woronka | H04L 63/1491 |
| 2018/0115523 A1* | 4/2018 | Subbarayan | H04L 63/02 |
| 2018/0191779 A1* | 7/2018 | Shieh | H04L 63/1425 |
| 2018/0212995 A1* | 7/2018 | Sysman | G06F 21/554 |
| 2018/0234438 A1* | 8/2018 | Touboul | H04L 63/1416 |
| 2018/0248896 A1* | 8/2018 | Challita | G06F 21/6218 |
| 2018/0309787 A1* | 10/2018 | Evron | G06F 21/121 |
| 2018/0375897 A1* | 12/2018 | Kawasaki | H04L 63/1491 |
| 2019/0199747 A1* | 6/2019 | Saher | H04L 63/1416 |
| 2019/0238589 A1* | 8/2019 | Stutz | H04L 63/1408 |
| 2019/0342309 A1* | 11/2019 | Boss | H04L 63/1491 |
| 2019/0379677 A1* | 12/2019 | Zenz | H04L 63/0227 |
| 2019/0379694 A1* | 12/2019 | Ben David | H04L 63/1491 |
| 2020/0067981 A1* | 2/2020 | Ramachandra | H04L 63/1425 |
| 2020/0092165 A1* | 3/2020 | Sellers | H04L 63/20 |
| 2020/0177556 A1* | 6/2020 | Subbarayan | H04L 63/1491 |

\* cited by examiner

| Honeytoken Tracker State Table 125 | | | | | | |
|---|---|---|---|---|---|---|
| Attack Event Field 305 | Attacker Source Field 310 | Targeted Honeypot Field 315 | Access Credentials Field 320 | Attack Metadata Field 325 | Horizontal Target Field 330 | Vertical Target Field 335 | Attack Context Field 340 |
| HTTP honey service | 208.118.227.1 | 105(1) | Credential information | Directory traversal | Mimicked Service 130(2) on honeypot 105(2) | Mimicked Service 130(1) | Honeytoken Tracker 185(1) |
| Database | 225.80.75.2 | 105(2) | Command shell | Meterpreter | None | Mimicked Service 130(2) on honeypot 105(2) | Honeytoken Tracker 185(1) and Personality 220(1) |
| SMB Services | 208.118.227.1 | 105(3) 105(4) 105(5) | Windows hashes | Pass the Hash | Mimicked Services 130(3)-(5) on honeypots 105(3)-(5) | None | Honeytoken Tracker 185(1) and Personality 220(2) |
| ... | ... | ... | ... | ... | ... | ... | ... |

FIG. 3

HONEYTOKEN TRACKER

CROSS-REFERENCE TO RELATED APPLICATIONS

The present application claims the benefit (and is a Continuation-In-Part (CIP)) of U.S. Utility patent application Ser. No. 16/367,502 titled "Multiple Personality Deception Systems" and filed on Mar. 28, 2019, the disclosure of which is incorporated by reference as if set forth in its entirety herein.

BACKGROUND

Field of the Disclosure

This disclosure is related to deception systems implemented in cybersecurity computing environments. In particular, this disclosure is related to tracking honeytokens.

Description of the Related Art

Honeypots are physical or virtual computing systems implemented in a network as a decoy to lure malicious actors (e.g., hackers) in an attempt to detect, deflect, and/or study hacking attempts. Such deception systems can be configured as an enticing target for attackers (e.g., as a high-value server) and can be used to gather valuable attack telemetry data (e.g., identity of attackers, attack mechanism(s) used, targets sought, and the like). Therefore, honeypots are implemented in modern cybersecurity computing environments to identify and defend (against) attacks from advanced persistent threat actors.

Honeytokens, unlike honeypots, are not computer systems, but are instead data items (e.g., credentials, identifiers, strings, and the like) whose purpose is to be accessed and used by an unauthorized party (e.g., a malicious attacker), and in doing so, reveal that the repository or location holding the honeytoken has been compromised. Unfortunately, existing cybersecurity techniques deploy honeytokens in a limited manner that only indicates that a specific resource has been compromised and therefore, do not provide attacker lifecycle visibility. Therefore, it is desirable to track honeytokens to gain attacker lifecycle visibility.

SUMMARY OF THE DISCLOSURE

Disclosed herein are methods, systems, and processes for tracking honeytokens. One such method involves receiving a malicious attack from an attacker at a honeypot, determining that an attack event associated with the malicious attack has compromised deceptive credential information maintained by the honeypot, generating a unique credential pair that corresponds to the deceptive credential information sought by the attack event, modifying a honeytoken tracker state table to include the unique credential pair and attack event metadata in association with the attack event, and transmitting the unique credential pair to the attacker.

In one embodiment, the malicious attack is intended for a protected host and the compromised credential information is associated with the protected host or one or more services provided by the protected host. In another embodiment, the method involves synchronizing the honeytoken tracker state table with a honeypot management system and monitoring vertical or horizontal movement of the malicious attack as part of a next step of the malicious attack performed using the unique credential pair. In some embodiments, the method involves updating the honeytoken tracker state table if the next step comprises vertical movement of the malicious attack or receiving confirmation that one or more other honeypots have updated the honeytoken tracker state table maintained by the honeypot management system if the next step includes horizontal movement of the malicious attack. In other embodiments, the deceptive credential information is required to access a service of the one or more services provided by the protected host and the one or more services are mimicked by the honeypot or the one or more other honeypots. In certain embodiments, the method involves detecting another malicious attack, accessing the honeytoken tracker state table, correlating the another malicious attack to the attacker, accessing a honeypot personality state table maintained by the honeypot management system, and generating a present personality for the honeypot that is substantially similar to a past personality of the honeypot that existed during the malicious attack based on information in the honeypot personality state table.

The foregoing is a summary and thus contains, by necessity, simplifications, generalizations and omissions of detail; consequently the summary is illustrative and is not intended to be limiting. Other aspects, features, and advantages of the present disclosure, as defined solely by the claims, will become apparent in the non-limiting detailed description.

BRIEF DESCRIPTION OF THE DRAWINGS

The present disclosure may be better understood, and its numerous objects, features and advantages made apparent to those skilled in the art by referencing the drawings and/or figures.

FIG. 3 is table 300 that illustrates a honeytoken tracker state table, according to one embodiment of the present disclosure.

Figure 1A:
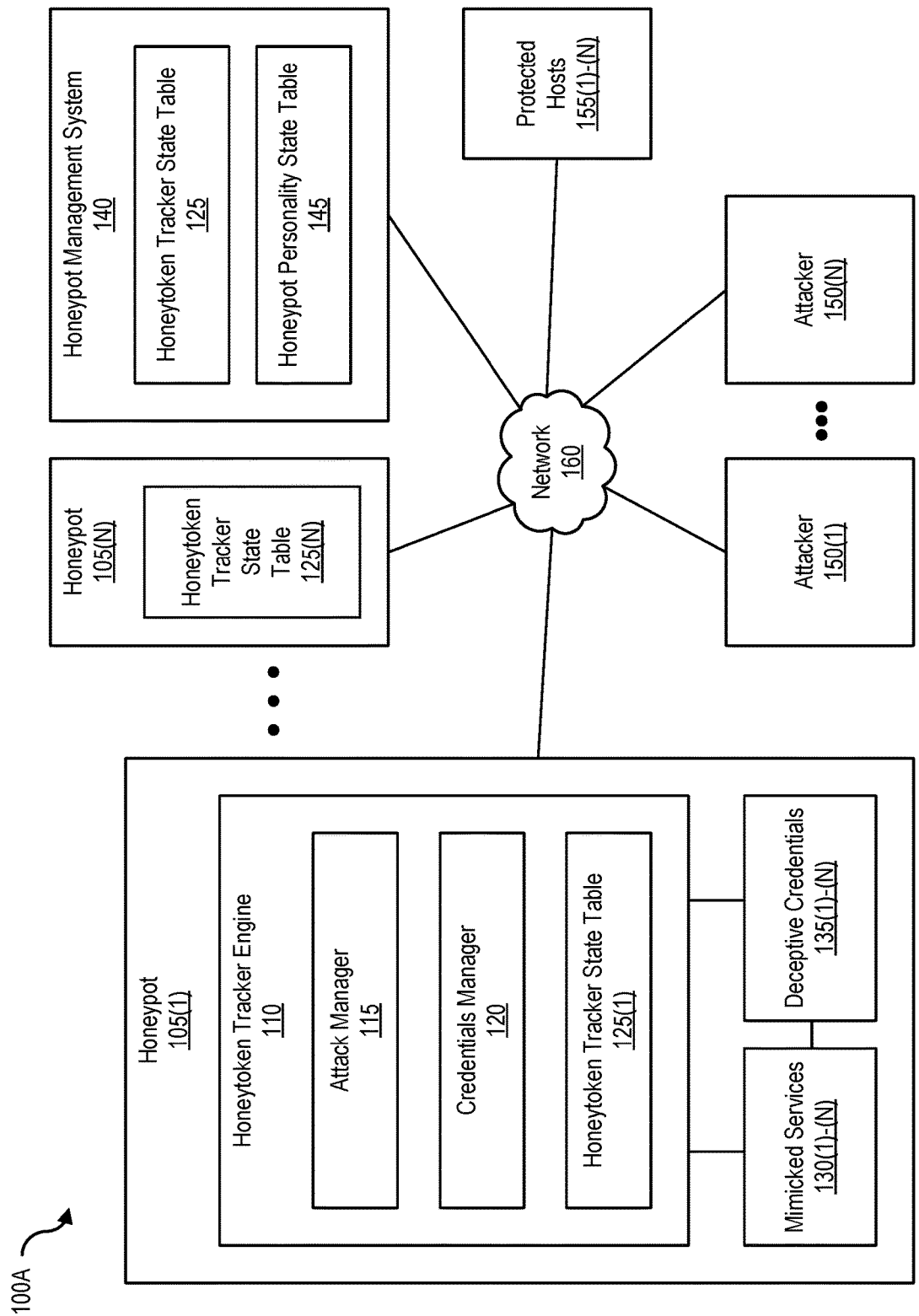
FIG. 1A is a block diagram 100 of a computing system to track honeytokens, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Honeytokens are data items (e.g., credentials, identifiers, strings, and the like) that can be accessed and used by a malicious attacker as part of a malicious attack. If and when accessed and/or used, honeytokens provide an indication that a repository or location (e.g., a network share, a storage device, a database, and the like) holding the honeytoken has been compromised by the malicious attacker. Therefore, in addition to honeypots, honeytokens are implemented in modern cybersecurity computing environments.

Honeytokens can include email addresses, database data, executable files, embedded links, web beacons, browser cookies, Amazon Web Services (AWS) keys, and the like. Honeytokens look enticing to attackers, are possible to detect when accessed and/or used, and in existing implementations and paradigms, do not have any actual value other than use detection (e.g., to indicate that a given data repository or network location has been compromised).

Unfortunately, such limited honeytoken deployment and utilization is inadequate. Because honeytoken use and/or access detection only indicates that a specific resource may have been compromised, existing honeytoken deployment techniques do not provide attacker lifecycle visibility. Disclosed herein are methods, systems, and processes that dynamically generate attacker specific honeytokens, enabling operators to track the use of honeytokens to build attack lifecycle and attribution maps. The logging and tying of honeytokens over time, assets, and protocols facilitates the painting of a fuller picture of how an attacker moves through a network.

Example Honeytoken Tracking System

FIG. 1 is a block diagram 100 of a computing system to track honeytokens, according to one embodiment. Honeypot 105(1), which can be any type of physical or virtual computing device, includes at least a honeytoken tracker engine 110 with an attacker manager 115, a credentials manager 120, and a honeytoken tracker state table 125(1). Honeypot 105(1) also includes mimicked services 130(1)-(N) and deceptive credentials 135(1)-(N).

Honeypot 105(1) is communicatively coupled to honeypot 105(N) (with honeytoken tracker state table 125), a honeypot management system 140 (with honeytoken tracker state table 125 and a honeypot personality state table 145), and protected hosts 155(1)-(N) via network 160, which can be any type of network or interconnection. Honeypots 105(1)-(N) are capable of accepting operating system (OS) and/or application authentication attempts.

Honeypot management system 140 provides centralized configuration, deployment, management, and operation of the honeypot ecosystem of FIGS. 1A and 3. In one embodiment, honeytoken tracker state table 125 is a data structure and construct that is internal to honeypot 105(1) and stores the state of "honeytoken trackers" (or simply "honey trackers"). In one embodiment, honeytoken tracker state table 125 can be synchronized with a centrally stored honeytoken tracker state table 125 in honeypot management system 140 to facilitate the centralized reporting of credentials and the presentation of a consistent computing environment to attackers, where appropriate (in addition to generating an attribution map of the attack lifecycle).

In certain embodiments, unique honeytokens (called honey trackers) are provided to malicious attackers (e.g., one or more attackers 150(1)-(N)) and are tracked as the malicious attacker(s) target multiple systems over time and/or source malicious attacks from multiple network addresses. Therefore, unlike traditional honeytokens, which only indicate that a certain asset has been accessed, honey trackers, by virtue of being unique to a particular event (e.g., an attack event detected by attacker manager 115), permit the correlation/attribution of malicious attacks over time even if malicious attackers change their source Internet Protocol (IP) address, pivot through another host, or reflect the malicious attack. In this example, the use of such context-based honeytokens is logged and then tied together over time, computing assets, and protocols, in order to paint a fuller picture of how the malicious attacker moves through network 160.

Figure 1B:
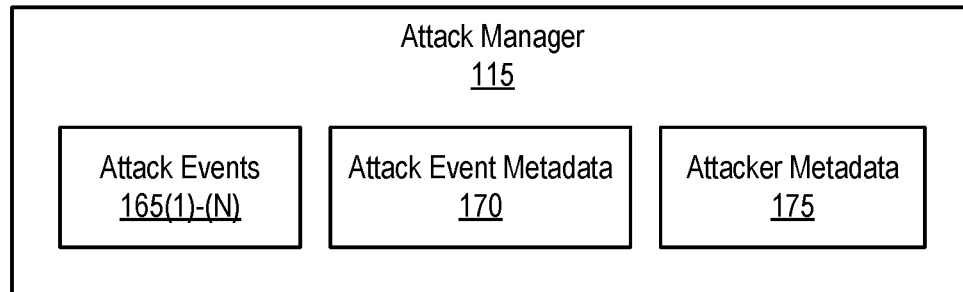
FIG. 1B is a block diagram 100B of an attack manager, according to one embodiment of the present disclosure.

FIG. 1B is a block diagram 100B of an attack manager 115, according to one embodiment. Attacker manager 115 implemented by honeypot 105(1) includes at least attack events 165(1)-(N), attack event metadata 170, and attacker metadata 175. An attack event is part of a malicious attack (e.g., the leveraging of a directory traversal attack against a Hypertext Transfer Protocol (HTTP) honey service) from which attack manager 115 extracts attack event metadata (e.g., the type of attack, the compromised service, and the like) and attacker metadata (e.g., the identity of the attacker, source IP address of the attacker, and the like.

Attack manager 115 separately (and uniquely) keeps track of each attack event (e.g., each of attack events 165(1)-(N)) from individual attackers as well as each subsequent attack event perpetrated by a given attacker as they advance horizontally or vertically as part of the current malicious attack, which in this example, can be a continuation of a previous malicious attack perpetrated by the same attacker. In this manner, attack manager 115 manages the entire lifecycle of a current attack and correlates (or associates) the current attack with one or more previous attacks based on one or more similarities (e.g., the same attacker, the same source IP address or the same range of source IP addresses, the same computing assets targeted, and the like).

Figure 1C:
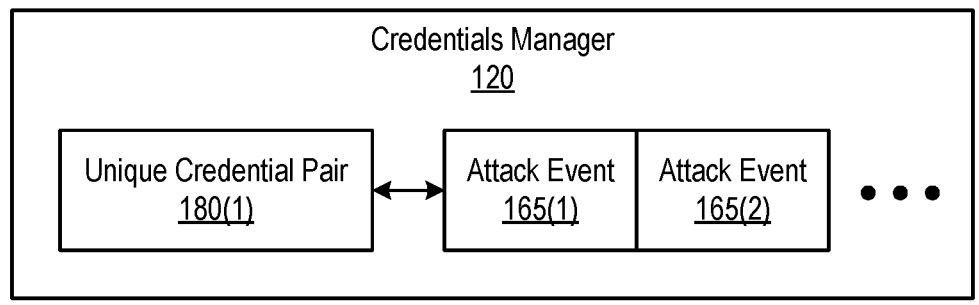
FIG. 1C is a block diagram 100C of a credentials manager, according to one embodiment of the present disclosure.

FIG. 1C is a block diagram 100C of a credentials manager 120, according to one embodiment. Credentials manager 120 includes at least a unique credential pair 180(1) (e.g., a credential such as a username and a password used/provided by an attacker to authenticate an OS and/or an application on honeypot 105(1)) that is associated with or correlated to one or more attack events such as attack events 165(1) and 165(2). In this manner, credentials manager 120 maintains multiple unique credential pairs and corresponding attack events (or corresponding chain of attack events).

Figure 1D:
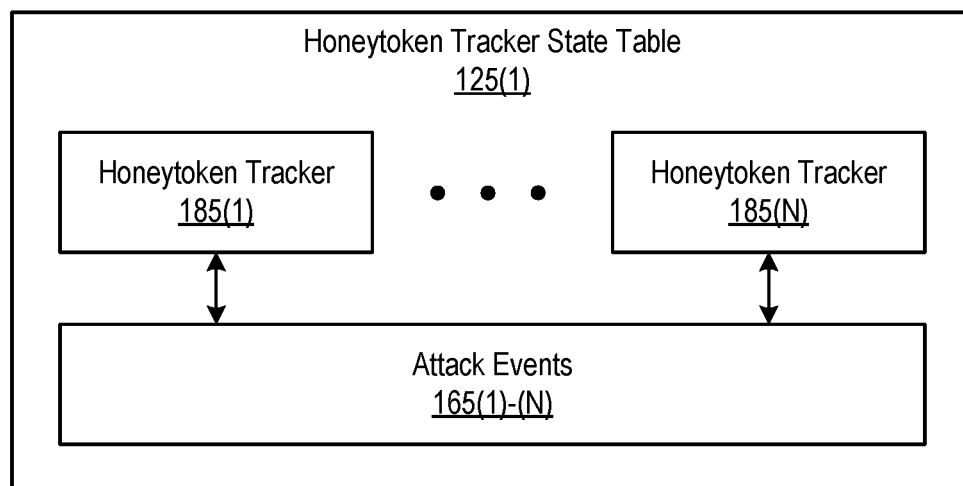
FIG. 1D is a block diagram 100D of a honeytoken tracker state table, according to one embodiment of the present disclosure.

FIG. 1D is a block diagram 100D of a honeytoken tracker state table 125(1), according to one embodiment. Honeytoken tracker state table 125(1) includes honeytoken trackers 185(1)-(N) (e.g., context-based honey tokens that can be tracked throughout an attack lifecycle, and are hence called honeytoken trackers or simply, honey trackers) that are each associated with one or more attack events 165(1)-(N). Therefore, honeytoken tracker state table 125(1) can be used to track the lifecycle of multiple attack events using honeytoken trackers 185(1)-(N) that are unique to a particular attack event and permit correlation of attack events over time.

In one embodiment, honeypot 105(1) receives a malicious attack intended for protected host 155(1) from attacker 150(1) and determines that attack event 165(1) associated with the malicious attack includes compromised deceptive credential information (e.g., deceptive credential 135(1)). In this example, honeytoken tracker engine 110 generates unique credential pair 180(1) that corresponds to the compromised deceptive credential information (e.g., deceptive credential 135(1)) sought by attack event 165(1) (and associated with protected host 155(1) or one or more services provided by protected host 155(1) (e.g., one or more of mimicked services 130(1)-(N)), modifies honeytoken tracker state table 125(1) to include unique credential pair 180(1) and attack event metadata (e.g., attack event metadata 170(1) associated with attack event 165(1)), and transmits unique credential pair 180(1) to attacker 150(1).

In another embodiment, honeytoken tracker engine 110 synchronizes honeytoken tracker state table 125(1) with honeypot management system 140 (e.g., with honeytoken tracker state table 125 for centralized reporting of deceptive credentials and presentation of a consistent honeypot ecosystem to attacker 150(1)) and monitors vertical or horizontal movement or advancement of the malicious attack as part of a next step of the malicious attack performed using unique credential pair 180(1) (e.g., attack event 165(2) as shown in FIG. 1C).

In some embodiments, honeytoken tracker engine 110 updates honeytoken tracker state table 125(1) if the next step (e.g., attack event 165(2)) involves vertical movement of the malicious attack. In other embodiments, honeytoken tracker engine 110 receives confirmation from other honeypots that one or more other honeypots (e.g., one or more of honeypots 105(2)-(N)) have updated honeytoken tracker state table 125 maintained by honeypot management system 140 if the next step (e.g., attack event 165(2)) involves horizontal movement of the malicious attack.

In these examples, vertical movement of the malicious attack involves attacker 150(1) perpetrating attack event 165(2) on one or more services (e.g., honey services) mimicked by honeypot 105(1) for protected host 155(1) (e.g., one or more of mimicked services 130(2)-(N), assuming at least one mimicked service 130(1) was exploited as part of attack event 165(1)) and horizontal movement of the malicious attack involves attacker 150(1) perpetrating attack event 165(2) on one or more (honey) services mimicked by one or more of honeypots 105(2)-(N) for one or more of protected hosts 155(2)-(N).

Example of Tracking Attack Lifecycle Using Honeytoken Trackers

Figure 2:
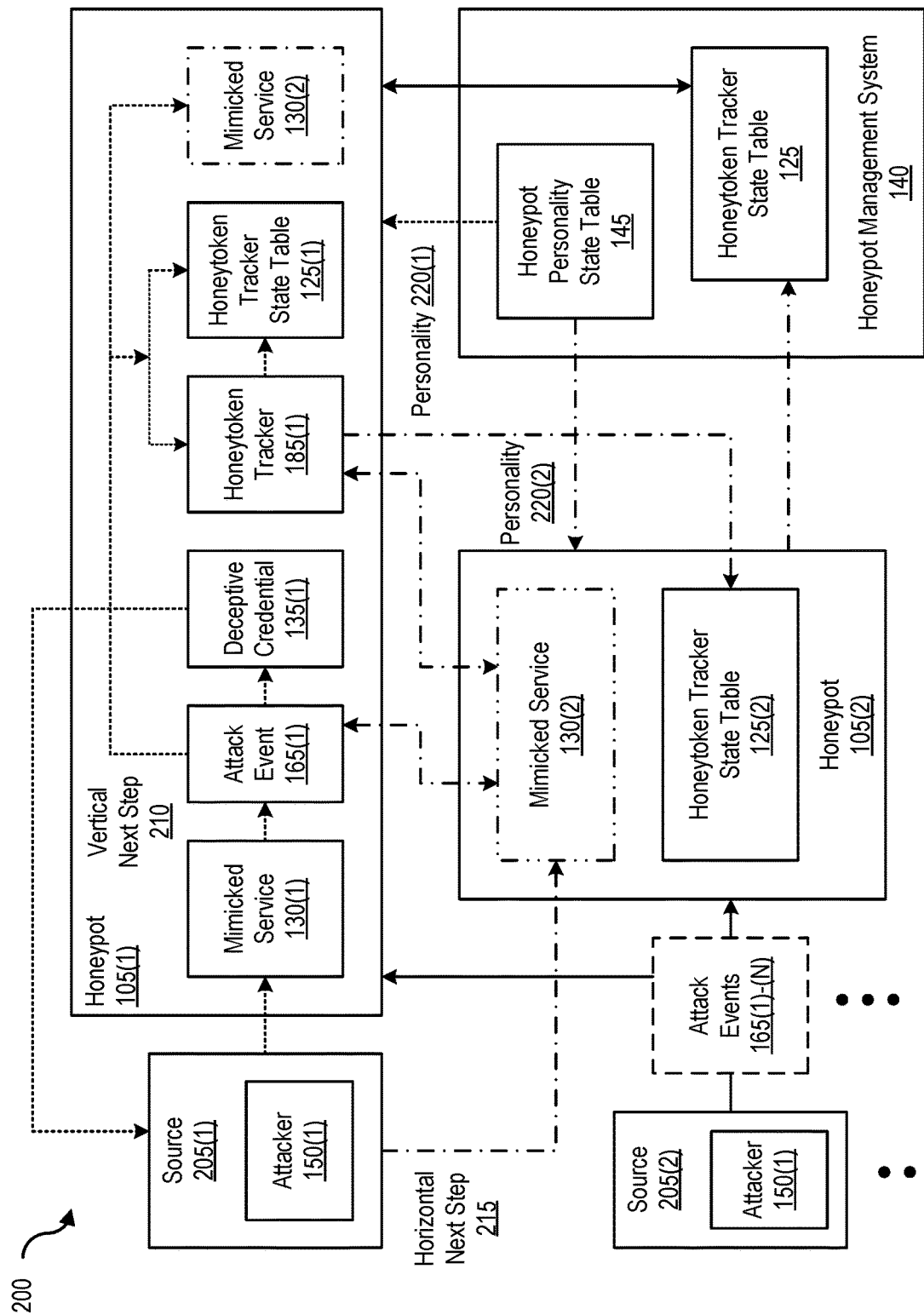
FIG. 2 is a block diagram 200 of a honeytoken tracker system, according to one embodiment of the present disclosure.

FIG. 2 is a block diagram 200 of a honeytoken tracker system, according to one embodiment. As shown in FIG. 2, honeypot 105(1) receives a malicious attack from attacker 150(1) and source 205(1) which can include, but is not limited to, Ransomware, man-in-the-middle, worm, Trojan, buffer overflow, heap overflow, stack overflow, format string attack, or any other type of malicious attack or vulnerability exploit mechanism that results in credential compromise or the risk of compromised credentials.

In certain embodiments, honeytoken tracker engine 110 determines that attack event 165(1) has compromised deceptive credential 135(1) maintained by honeypot 105(1) and generates unique credential pair 180(1) (e.g., username and password) that corresponds to deceptive credential 135(1) sought by attack event 165(1) (e.g., to gain access to and/or authenticate with mimicked service 130(1)). Honeytoken tracker engine 110 generates honeytoken tracker 185(1) and modifies honeytoken tracker state table 125(1) to include unique credential pair 180(1) and associated metadata (e.g., attack event metadata 170 and attacker metadata 175) in association with attack event 165(1) as honeytoken tracker 185(1) (e.g., a context-based honey tracker) before transmitting unique credential pair 180(1) to attacker 150(1).

In some embodiments, if the next step of attacker 150(1) is a vertical next step 210 as shown in FIG. 2 (e.g., if attacker 150(1) advances within honeypot 105(1) to mimicked service 130(2)), honeytoken tracker engine 110 updates honeytoken tracker state table 125(1) and synchronizes the update(s) with honeytoken tracker state table 125 maintained by honeypot management system 140 by correlating attack event 165(1) with mimicked service 130(2) if the vertical advancement of attacker 150(1) is part of the same/original attack event (e.g., attack event 165(1)) or by correlating attack event 165(2) with mimicked service 130(2) if the vertical advancement of attacker 150(1) is part of a different/separate attack event (e.g., attack event 165(2)). In other embodiments, honeypot 105(2) updates honeytoken tracker state table 125(2) and/or honeytoken tracker state table 125 maintained by honeypot management system 140 if the next step of attacker 150(1) is a horizontal next step 215 as shown in FIG. 2 (e.g., if attacker 150(1) advances horizontally from honeypot 105(1) to honeypot 105(2) to mimicked service 130(2) as part of the same/original attack event 165(1) or as part of a new/separate attack event 165(2)).

In certain embodiments, as part of detecting a new malicious attack (e.g., from the same source IP address, range of source IP addresses, or from the same malicious attacker), honeytoken tracker engine 110 accesses honeytoken tracker state table 125, correlates the new malicious attack to the attacker, accesses honeypot personality state table 145 maintained by honeypot management system 140 (as shown in FIG. 2), and generates a present personality for the honeypot (e.g., personality 220(1) for honeypot 105(1) and/or personality 220(2) for honeypot 105(2) as shown in FIG. 2) that is substantially similar to a past personality of the honeypot that existed during a previous malicious attack based on information in honeypot personality state table 125.

For example, the present personality can include one or more mimicked services, banner information, OS, and protocol information for a honeypot that is subject to the new malicious attack that is the same or substantially similar to one or more mimicked services, banner information, OS, and protocol information for the honeypot when it was subject to the previous malicious attack. Because honeypot personality state table 145 maintains the personality profiles of honeypots at a point in time (e.g., a honeypot snapshot), the combination of honeytoken trackers that are correlated to attack events maintained by honeytoken tracker state table 125 and historic honeypot personality snapshots maintained by honeypot personality state table 145 enables attack lifecycle continuity while facilitating the presentation of a consistent honeypot ecosystem.

Example of Tracking Honeytokens Using a Honeytoken Tracker State Table

FIG. 3 is table 300 that illustrates a honeytoken tracker state table, according to one embodiment. As noted, honeytoken tracker state table 125 can be maintained in a distributed manner by individual honeypots (and shared between each other, for example, when updated or modified after a malicious attack or an attack event), or can be maintained centrally by honeypot management system 140 (and subject to synchronization). As shown in FIG. 3, honeytoken tracker state table 125 includes at least an attack event field 305 that identifies specific attack events, an attacker source field 310 that includes the source IP address of an attacker, a targeted honeypot field 315 that identifies specific honeypots targeted as part of an attack event, an access credentials field 320 that specifies unique credentials sought by the attacker, an attack metadata field 325 that identifies specific exploits and/or vulnerabilities, a horizontal target field 330, a vertical target field 335, and an attack context field 340.

In one embodiment, a honeytoken tracker maintained by a honeytoken tracker state table is a credential (e.g., a unique credential pair of a username and a password) in addition to attached or associated, or combined or correlated with, tracking information that can include, but is not limited to, one or more attack events (e.g., a directory traversal, and the like), attack event metadata (e.g., exploits used, vulnerabilities exploited or sought to be exploited), and attacker metadata (e.g., source IP address of attacker, and the like), as well as one or more previous honeypot personalities (e.g., banners, protocols, services, configured OS, and the like) that are associated with the honeypot if previously targeted by the attacker (e.g., "honeytoken tracker"=a combination of two or more of a unique credential pair+attack event(s)+attack event metadata+attacker metadata+honeypot personality, stored and/or maintained centrally or in a distributed manner in a honeytoken tracker state table).

In certain embodiments, an attacker leverages a directory traversal attack against a HTTP honey service and "compromises" a database connection and credential information found in source code or configuration information. In this example, the honeypot generates a unique credential pair (e.g., username and password) and logs the unique credential pair (e.g., unique credential pair 180(1)) in a honeytoken tracker state table (e.g., honeytoken tracker state table 125 as shown in FIGS. 1A and 3) along with information about the attacker such as source and target network address, exploit vector, and the like (e.g., attack event metadata 170 and attack metadata 175). In one embodiment, the unique credentials are returned to the attacker as part of the compromised file and the database connection information points to the same or another honeypot hosting database services (or to valid services).

In another embodiment, the attacker leverages the credentials to access the database on the honeypot and the (database) honeypot checks the honeytoken tracker state table and determines that the credentials are "valid" and permits access. In this example, the database honeypot does not permit access unless specific configured credentials are used or unless the credentials exist in the honeytoken tracker state table. Doing so, preserves the appearance that the given host is a legitimate database server with functional access controls (although the attacker is accessing a database honeypot). In one embodiment, the database includes a virtual table space that is presented to the attacker with the goal of maintaining the illusion or deception that the host is legitimate (e.g., the legitimate database server).

In some embodiments, the attacker leverages Microsoft Structured Query Language (MS SQL)'s xp_cmdshell command (e.g., a SQL server configuration option that enables control and execution of the xp_cmdshell extended stored procedure) in the database honeypot, deploys Meterpreter (e.g., a dynamically extensible payload that uses in-memory Dynamic-link library (DLL) injection stagers and is extended over a network at runtime), gains a shell (e.g., shell access), and dumps the Windows hashes (e.g., credential dumping). Since the foregoing steps occur in the honeypot, the attacker interaction is "fake" and the hashes are uniquely generated for this particular attacker and are logged with the honeytoken tracker state table.

In other embodiments, the attacker attempts to leverage the (same) credentials across the internal network by targeting Server Message Block (SMB) services with a Pass the Hash attack. In this example, if the targets are honeypots, the credential information (including the hash) are logged, which provides visibility into attacker movement and, if the attacker changes sources, can provide insight into attacker infrastructure and/or previously unknown compromised hosts (e.g., honeypot targets can be configured to look up the credentials in the honeytoken tracker state table and treat them as "valid"). If the targets are not honeypots, then the current attack fails as the credentials are not valid and the attempt is logged. However, even without knowledge of the hash that was used, the dynamically generated username may be sufficient to correlate the current/present attack with earlier/previous attacks against the honeypots.

Next, and in certain embodiments, the attacker discontinues the attack and a period of time passes (e.g., two weeks). After two weeks, for example, a Pass the Hash attack is used against a public facing production Exchange server (e.g., a production system). This (new) attack fails as the credentials are not valid and the attempt is logged (e.g., in honeytoken tracker state table). In this example, and as previously noted, even without knowledge of the hash that was used (in the current/new attack), the dynamically generated username may be sufficient to associate or correlate this new/current attack with the earlier attacks (e.g., the directory traversal, database, Meterpreter, and the first Pass the Hash attacks). In one embodiment, an attempt by the attacker to now use the (previously) "compromised" database credentials against other database servers in the computing environment (or network) causes the same results as the targeting of the SMB services with a Pass the Hash attack as discussed above (e.g., the attempt succeeds if the targets are honeypots and fails if the targets are not honeypots).

In one embodiment, a honeytoken tracker is placed within a computing infrastructure that provides protection so that the honeytoken tracker is only issued to attackers who have been effectively deceived into thinking they have "successfully" compromised or bypassed one or more security controls. In another embodiment, a particular attacker only sees (or is shown) the same honeytoken tracker when accessing the honeytoken tracker's logical location (e.g., this can be facilitated with a honeytoken tracker state table). In certain embodiments, the attacker sees (or is shown) the same honeypot personality when interacting with the same honeypot (over time). In this example, honeypot personality presentation can be facilitated using the honeytoken tracker state table or a honeypot personality state table.

Example Processes to Track Honeytokens

Figure 4:
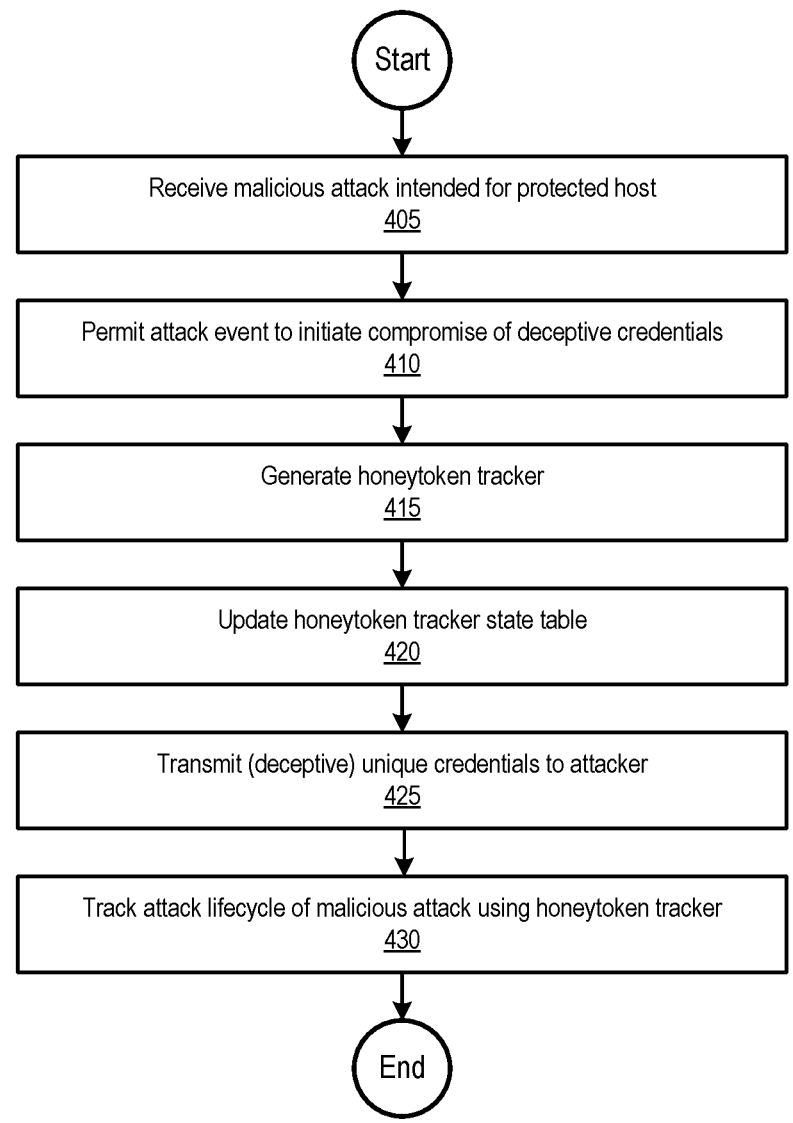
FIG. 4 is a flowchart 400 that illustrates a process for tracking the attack lifecycle using one or more honeytoken trackers, according to one embodiment of the present disclosure.

FIG. 4 is a flowchart 400 that illustrates a process for tracking the attack lifecycle using one or more honeytoken trackers, according to one embodiment. The process begins at 405 by receiving a malicious attack intended for a protected host (e.g., a production system such as a public facing Exchange server). The malicious attack can include, but is not limited to, Ransomware, man-in-the-middle, worm, Trojan, buffer overflow, heap overflow, stack overflow, format string attack, or any other type of malicious attack or vulnerability exploit mechanism that results in credential compromise or the risk of compromised credentials (e.g., a malicious attack that employs or requires credential-based authentication).

At 410, the process permits an attack event (e.g., attack event 165(1) which can be a directory traversal attack against a HTTP honey service, among other attack mechanisms) to initiate compromise of deceptive credentials (e.g., a unique credential pair), and at 415, generates a honeytoken tracker (e.g., a honeytoken correlated with the attack event and associated attacker metadata and/or attack event metadata). At 420, the process updates a honeytoken tracker state table (e.g., logs the honeytoken tracker). In this example, the honeytoken tracker state table is maintained by a honeypot and is synchronized with a honeypot management system. At 425, the process transmits (deceptive) unique credentials to the attacker (e.g., a fake username and password combination in response to an authentication request to an OS or application from the attacker as part of the malicious attack). The process ends at 430 by tracking the attack lifecycle of the malicious attack using the honeytoken tracker (e.g., as shown in FIG. 3).

Figure 5:
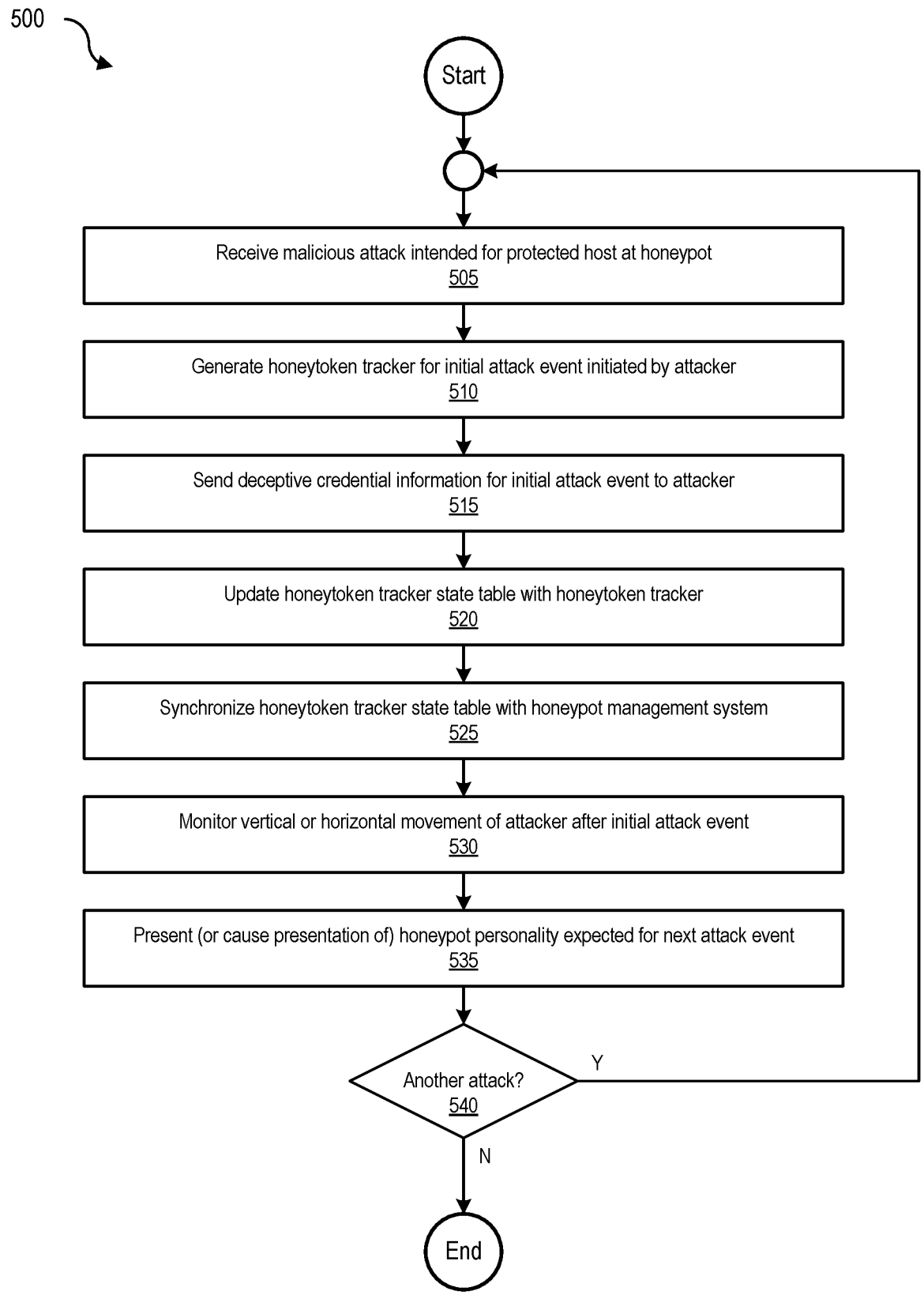
FIG. 5 is a flowchart 500 that illustrates a process for monitoring attacker movement using honeytrackers, according to one embodiment of the present disclosure.

FIG. 5 is a flowchart 500 that illustrates a process for monitoring attacker movement using honeytrackers, according to one embodiment. The process begins at 505 by receiving a malicious attack intended for a protected host at a honeypot (e.g., honeypot 105(1) as shown in FIG. 1A). At 510, the process generates a honeytoken tracker for the initial attack event initiated by the attacker (e.g., honeytoken tracker 185(1)), and at 515, sends deceptive credential information from the initial attack event to the attacker. At 520, the process updates a honeytoken tracker state table with the honeytoken tracker, and at 525, synchronizes the honeytoken tracker state table (maintained locally by the honeypot) with a honeypot management system (e.g., honeypot management system 140 as shown in FIG. 1A).

At 530, the process monitors vertical or horizontal movement of the attacker after the initial attack event (e.g., vertical next step 210 or horizontal next step 215 as shown in FIG. 2), and at 535, presents (or causes the presentation of) the honeypot personality expected (or sought) for the next attack event (e.g., personality 220(1) or personality 220(2) in honeytoken tracker state table 125 as shown in FIG. 3). In one embodiment, the process accesses a honeypot personality state table maintained by the honeypot management system for personality presentation. At 540, the process determines if there is another attack. If there is another attack, the process loops to 505. Otherwise, the process ends.

Figure 6:
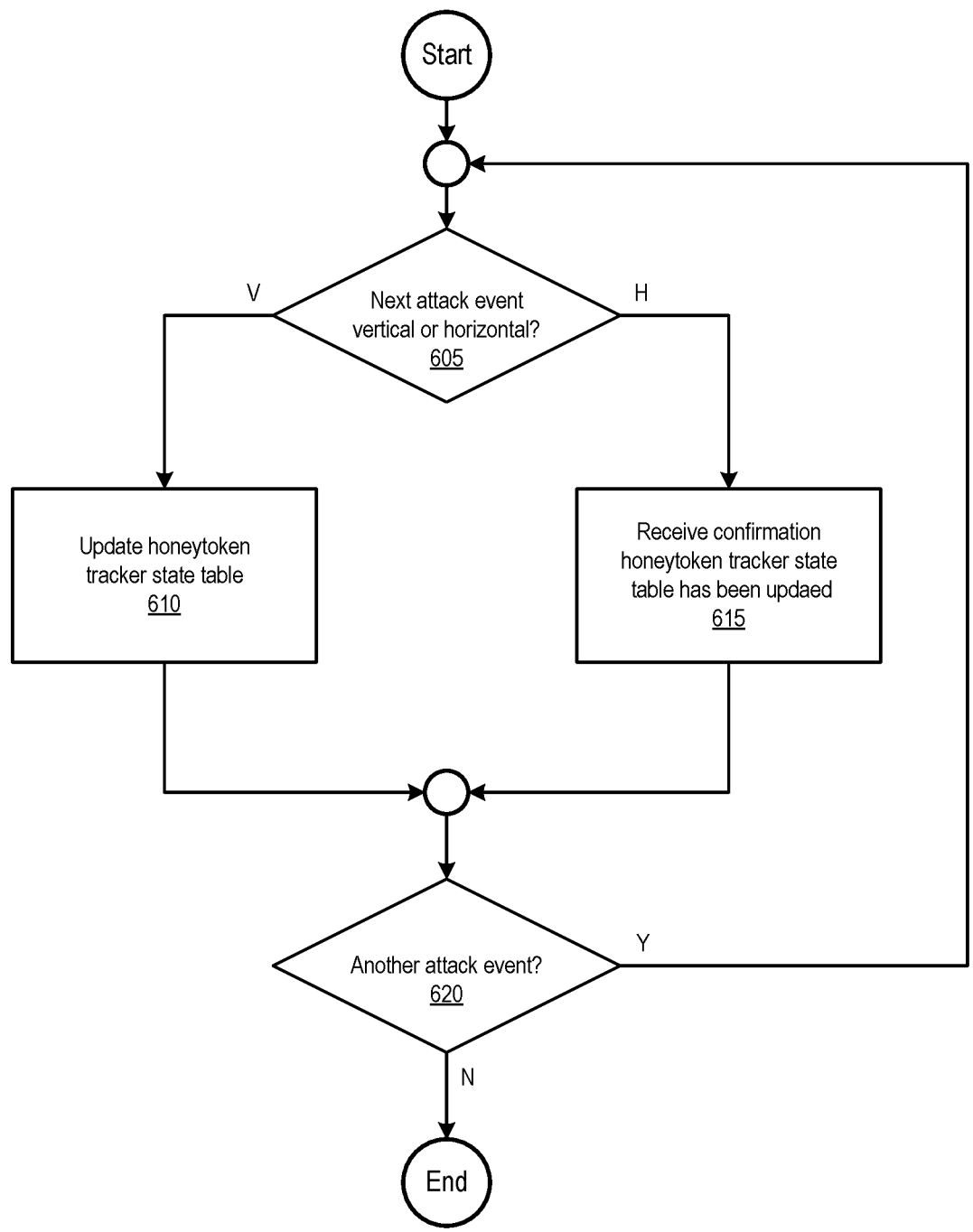
FIG. 6 is a flowchart 600 that illustrates a process for updating a honeytoken tracker state table, according to one embodiment of the present disclosure.

FIG. 6 is a flowchart 600 that illustrates a process for updating a honeytoken tracker state table, according to one embodiment. The process begins at 605 by determining whether the next attack event is vertical or horizontal (e.g., vertical next step 210 or horizontal next step 215 as shown in FIG. 2). If the next attack event is vertical, the process, at 610, updates a honeytoken tracker state table (e.g., because a vertical move indicates that the attacker is still operating within the same honeypot but has moved on to a different service, application, and the like).

On the other hand, if the next attack event is horizontal (e.g., horizontal next step 215), the process, at 615, receives confirmation that the honeytoken tracker state table has been updated (e.g., from a different honeypot or the honeypot management system because, a horizontal move indicates that the attacker has moved on to a different honeypot altogether). At 620, the process determines if there is another attack event. If there is another attack event, the process loops to 605. Otherwise, the process ends.

Figure 7:
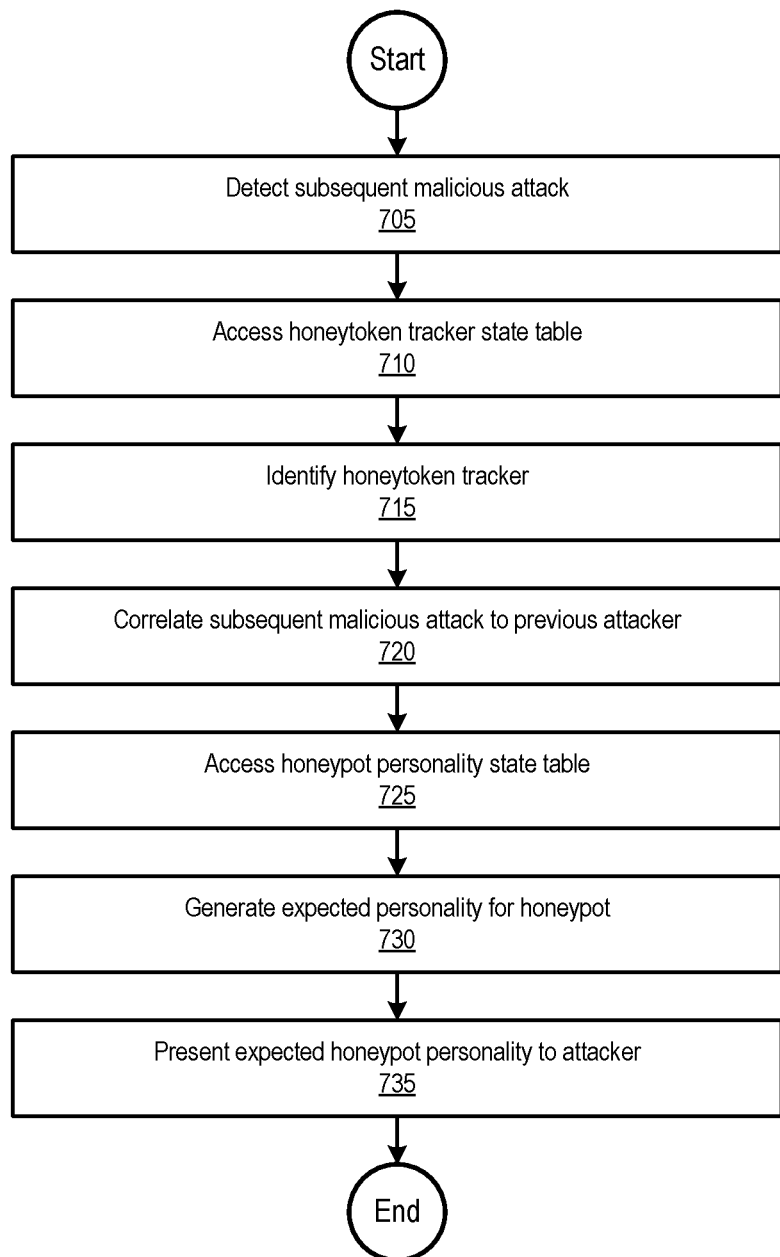
FIG. 7 is a flowchart 700 that illustrates a process for presenting an expected honeypot personality to an attacker, according to one embodiment of the present disclosure.

FIG. 7 is a flowchart 700 that illustrates a process for presenting an expected honeypot personality to an attacker, according to one embodiment. The process begins at 705 by detecting a subsequent malicious attack (e.g., from the same attacker, from the same attacker but a different source, or from a different attacker), and at 710, accesses a honeytoken tracker state table. At 715, the process identifies a honeytoken tracker (e.g., a previously generated honeytoken tracker that is associated with and/or correlated to a previous attack (and attack events)).

At 720, the process correlates the subsequent malicious attack to a previous attacker (e.g., based on attack vectors, attack event metadata, and/or attack metadata). At 725, the process accesses a honeypot personality state table, and at 730, generates an expected (or sought) personality for the honeypot (e.g., banners, protocols, OS, services, and the like). The process ends at 735 by presenting the expected honeypot personality to the attacker.

Example Computing Environment

Figure 8:
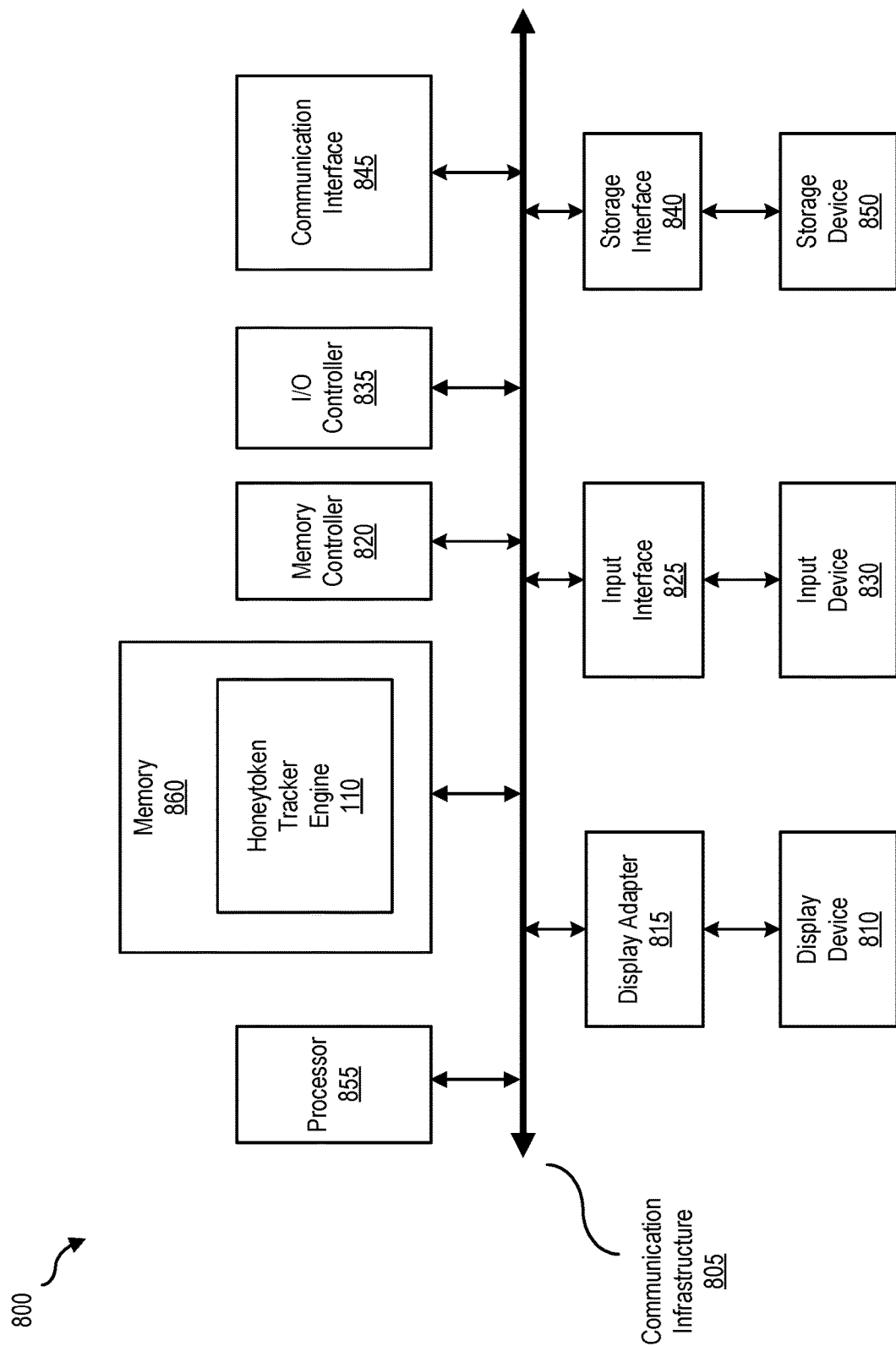
FIG. 8 is a block diagram 800 of a computing system, illustrating how a best path manager can be implemented in software, according to one embodiment of the present disclosure.

FIG. 8 is a block diagram 800 of a computing system, illustrating how a honeytoken tracker engine can be implemented in software, according to one embodiment. Computing system 800 can include honeypot 105(1) and/or honeypot management system 140 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes honeytoken tracker engine 110, computing system 800 becomes a special purpose computing device that is configured to track honeytokens.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 800 may include both a volatile memory unit and a non-volatile storage device. In one example, program instructions implementing honeytoken tracker engine 110 may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein. I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type/form of communication device/adapter capable of facilitating communication between computing system 800 and other devices and may facilitate communication between computing system 800 and a private or public network. Examples of communication interface 845 include, a wired network interface (e.g., network interface card), a wireless network interface (e.g., a wireless network interface card), a modem, and any other suitable interface. Communication interface 845 may provide a direct connection to a remote server via a direct link to a network, such as the Internet, and may also indirectly provide such a connection through, for example, a local area network. Communication interface 845 may also represent a host adapter configured to facilitate communication between computing system 800 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 800 may also include at least one display device 810 coupled to communication infrastructure 805 via a display adapter 815 that generally represents any type or form of device capable of visually displaying information forwarded by display adapter 815. Display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of storage device 850. When executed by processor 855, a computer program loaded into computing system 800 may cause processor 855 to perform and/or be a means for performing the functions of one or more of the embodiments described/illustrated herein. Alternatively, one or more of the embodiments described and/or illustrated herein may be implemented in firmware and/or hardware. In certain embodiments, computing system 800 is a physical computing device (e.g., a physical machine) that implements honeypot 105(1) in the form of a virtual machine.

Example Networking Environment

Figure 9:
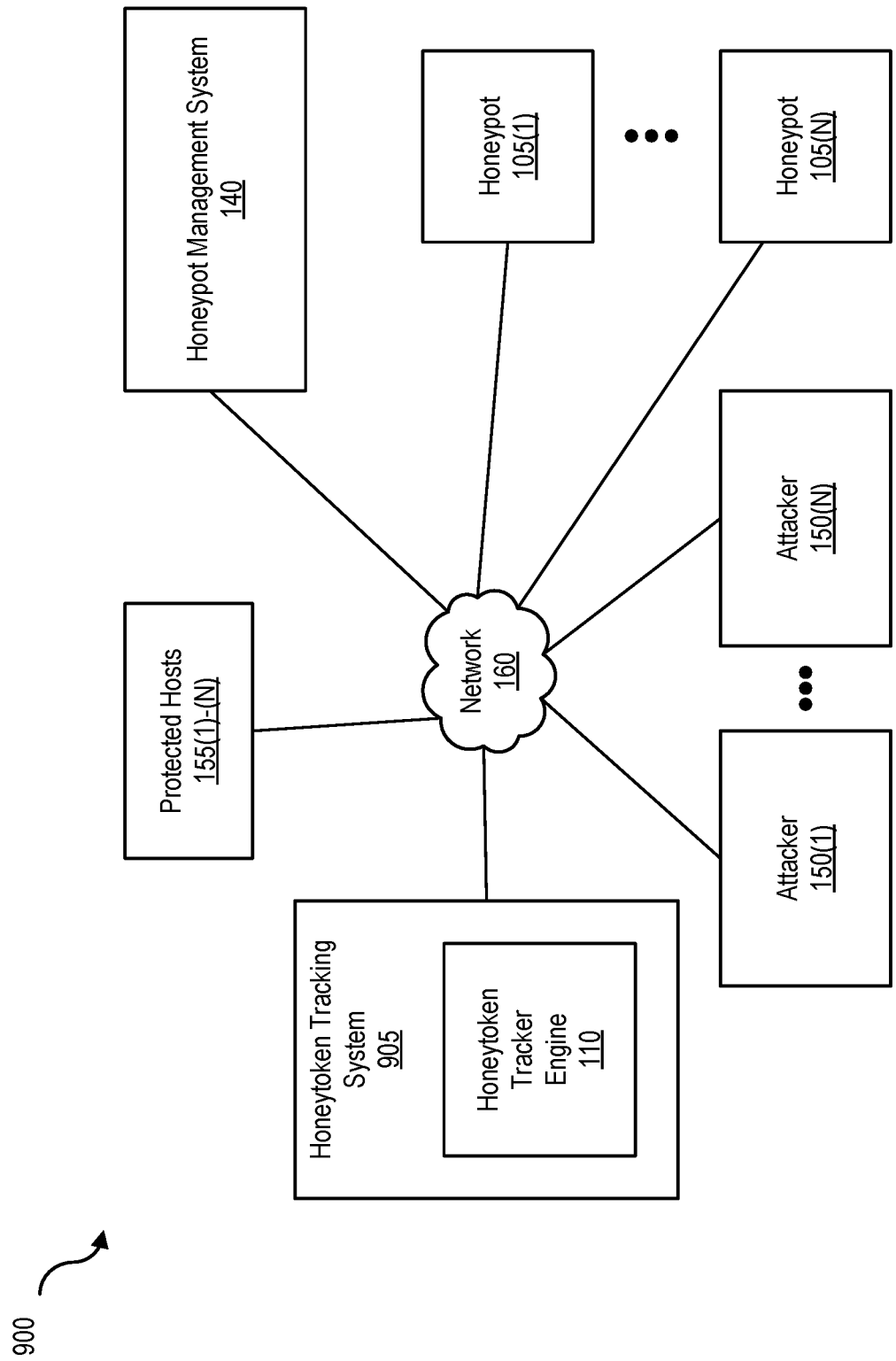
FIG. 9 is a block diagram 900 of a networked system, illustrating how various devices can communicate via a network, according to one embodiment of the present disclosure.

FIG. 9 is a block diagram of a networked system, illustrating how various computing devices can communicate via a network, according to one embodiment. Network 160 generally represents any type or form of computer network or architecture capable of facilitating communication between honeytoken tracking system 905, honeypots 105(1)-(N), and/or honeypot management system 140. For example, network 160 can be a Wide Area Network (WAN) (e.g., the Internet) or a Local Area Network (LAN). In certain embodiments, a communication interface, such as communication interface 845 in FIG. 8, may be used to provide connectivity between honeytoken tracking system 905, honeypots 105(1)-(N), and/or honeypot management system 140, and network 160. The embodiments described and/or illustrated herein are not limited to the Internet or any particular network-based environment.

In some embodiments, honeytoken tracker engine 110 may be part of honeytoken tracking system 905 or honeypot 105(1), or may be separate. If separate, honeytoken tracking system 905, honeypots 105(1), and/or honeypot management system 140 may be communicatively coupled via network 160. In one embodiment, all or a portion of one or more of the disclosed embodiments may be encoded as a computer program and loaded onto and executed by honeytoken tracking system 905, honeypots 105(1)-(N), and/or honeypot management system 140, or any combination thereof, and may be stored on honeytoken tracking system 905, honeypots 105(1)-(N), and/or honeypot management system 140, and distributed over network 160.

In some examples, all or a portion of honeytoken tracking system 905, honeypots 105(1)-(N), and/or honeypot management system 140 may represent portions of a cloud-computing or network-based environment. Such cloud-computing environments may provide various services and applications via the Internet. These cloud-based services (e.g., software as a service (SaaS), platform as a service, infrastructure as a service, etc.) may be accessible through a web browser or other remote interface.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
    receiving a malicious attack from an attacker at a honeypot;
    determining that an attack event associated with the malicious attack has compromised deceptive credential information maintained by the honeypot;
    generating a unique credential pair that corresponds to the compromised deceptive credential information sought by the attack event;
    generating a honeytoken tracker;
    modifying a honeytoken tracker state table with the honeytoken tracker that comprises the unique credential pair and attack event metadata in association with the attack;
    transmitting the unique credential pair to the attacker; and
    tracking a subsequent malicious attack from the attacker with the honeytoken tracker without processing a hash value associated with the unique credential pair that is used by the attacker as part of the subsequent malicious attack.

2. The computer-implemented method of claim 1, wherein
    the malicious attack is intended for a protected host, and
    the compromised deceptive credential information is associated with the protected host or one or more services provided by the protected host.

3. The computer-implemented method of claim 1, further comprising:
    synchronizing the honeytoken tracker state table with a honeypot management system.

4. The computer-implemented method of claim 3, further comprising:
    monitoring vertical or horizontal movement of the malicious attack as part of a next step of the malicious attack performed using the unique credential pair.

5. The computer-implemented method of claim 4, further comprising:
    updating the honeytoken tracker state table if the next step comprises vertical movement of the malicious attack, or
    receiving confirmation that one or more other honeypots have updated the honeytoken tracker state table maintained by the honeypot management system if the next step comprises horizontal movement of the malicious attack.

6. The computer-implemented method of claim 5, wherein
    the deceptive credential information is required to access a service of one or more services provided by the protected host, and
    the one or more services are mimicked by the honeypot or the one or more other honeypots.

7. The computer-implemented method of claim 3, further comprising:
    accessing the honeytoken tracker state table;
    correlating the subsequent malicious attack to the attacker using a dynamically generated username without knowledge of the hash value that was used as part of the subsequent malicious attack;
    accessing a honeypot personality state table maintained by the honeypot management system;
    generating a present personality for the honeypot that comprises one or more mimicked services, banner information, an operating system, and protocol information of a past personality of the honeypot that existed during the malicious attack based on information in the honeypot personality state table; and
    presenting the present personality for the honeypot to the attacker prior to an another attack event that is associated with the subsequent malicious attack.

8. A non-transitory computer readable storage medium comprising program instructions executable to:
    receive a malicious attack from an attacker at a honeypot;
    determine that an attack event associated with the malicious attack has compromised deceptive credential information maintained by the honeypot;
    generate a unique credential pair that corresponds to the compromised deceptive credential information sought by the attack event;
    generate a honeytoken tracker;

modify a honeytoken tracker state table with the honeytoken tracker that comprises the unique credential pair and attack event metadata in association with the attack;

transmit the unique credential pair to the attacker; and track a subsequent malicious attack from the attacker with the honeytoken tracker without processing a hash value associated with the unique credential pair that is used by the attacker as part of the subsequent malicious attack.

9. The non-transitory computer readable storage medium of claim 8, wherein the malicious attack is intended for a protected host, and the compromised deceptive credential information is associated with the protected host or one or more services provided by the protected host.

10. The non-transitory computer readable storage medium of claim 8, further comprising:

synchronizing the honeytoken tracker state table with a honeypot management system.

11. The non-transitory computer readable storage medium of claim 10, further comprising:

monitoring vertical or horizontal movement of the malicious attack as part of a next step of the malicious attack performed using the unique credential pair.

12. The non-transitory computer readable storage medium of claim 11, further comprising:

updating the honeytoken tracker state table if the next step comprises vertical movement of the malicious attack, or receiving confirmation that one or more other honeypots have updated the honeytoken tracker state table maintained by the honeypot management system if the next step comprises horizontal movement of the malicious attack.

13. The non-transitory computer readable storage medium of claim 12, wherein the deceptive credential information is required to access a service of one or more services provided by the protected host, and the one or more services are mimicked by the honeypot or the one or more other honeypots.

14. The non-transitory computer readable storage medium of claim 10, further comprising:

accessing the honeytoken tracker state table;

correlating the subsequent malicious attack to the attacker using a dynamically generated username without knowledge of the hash value that was used as part of the subsequent malicious attack;

accessing a honeypot personality state table maintained by the honeypot management system;

generating a present personality for the honeypot that comprises one or more mimicked services, banner information, an operating system, and protocol information of a past personality of the honeypot that existed during the malicious attack based on information in the honeypot personality state table; and presenting the present personality for the honeypot to the attacker prior to an another attack event that is associated with the subsequent malicious attack.

15. A system comprising:

one or more processors; and a memory coupled to the one or more processors, wherein the memory stores program instructions executable by the one or more processors to:

receive a malicious attack from an attacker at a honeypot;

determine that an attack event associated with the malicious attack has compromised deceptive credential information maintained by the honeypot;

generate a unique credential pair that corresponds to the compromised deceptive credential information sought by the attack event;

generate a honeytoken tracker;

modify a honeytoken tracker state table with the honeytoken tracker that comprises the unique credential pair and attack event metadata in association with the attack;

transmit the unique credential pair to the attacker; and track a subsequent malicious attack from the attacker with the honeytoken tracker without processing a hash value associated with the unique credential pair that is used by the attacker as part of the subsequent malicious attack.

16. The system of claim 15, wherein the malicious attack is intended for a protected host, and the compromised deceptive credential information is associated with the protected host or one or more services provided by the protected host.

17. The system of claim 15, further comprising:

synchronizing the honeytoken tracker state table with a honeypot management system.

18. The system of claim 17, further comprising:

monitoring vertical or horizontal movement of the malicious attack as part of a next step of the malicious attack performed using the unique credential pair; and updating the honeytoken tracker state table if the next step comprises vertical movement of the malicious attack, or receiving confirmation that one or more other honeypots have updated the honeytoken tracker state table maintained by the honeypot management system if the next step comprises horizontal movement of the malicious attack.

19. The system of claim 18, wherein the deceptive credential information is required to access a service of one or more services provided by the protected host, and the one or more services are mimicked by the honeypot or the one or more other honeypots.

20. The system of claim 17, further comprising:

accessing the honeytoken tracker state table;

correlating the subsequent malicious attack to the attacker using a dynamically generated username without knowledge of the hash value that was used as part of the subsequent malicious attack;

accessing a honeypot personality state table maintained by the honeypot management system;

generating a present personality for the honeypot that comprises one or more mimicked services, banner information, an operating system, and protocol information of a past personality of the honeypot that existed during the malicious attack based on information in the honeypot personality state table; and presenting the present personality for the honeypot to the attacker prior to an another attack event that is associated with the subsequent malicious attack.

* * * * *